United States Patent
Ahmad et al.

(10) Patent No.: US 11,120,689 B2
(45) Date of Patent: Sep. 14, 2021

(54) SYSTEMS AND METHODS FOR CONNECTED VEHICLE AND MOBILE DEVICE COMMUNICATIONS

(71) Applicant: Ford Global Technologies, LLC, Dearborn, MI (US)

(72) Inventors: Syed Amaar Ahmad, Canton, MI (US); Ivan Vukovic, Birmingham, MI (US); John Walpuck, West Bloomfield, MI (US); Jayanthi Rao, West Bloomfield, MI (US); Gopichandra Surnilla, West Bloomfield, MI (US); Jovan Zagajac, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 16/438,283

(22) Filed: Jun. 11, 2019

(65) Prior Publication Data
US 2020/0394919 A1    Dec. 17, 2020

(51) Int. Cl.
*B60Q 9/00*    (2006.01)
*G08G 1/16*    (2006.01)
(Continued)

(52) U.S. Cl.
CPC .............. *G08G 1/166* (2013.01); *B60R 21/34* (2013.01); *B60W 40/09* (2013.01); *B60W 50/14* (2013.01); *G08G 1/162* (2013.01); *H04W 4/44* (2018.02)

(58) Field of Classification Search
CPC ........ G08G 1/166; G08G 1/162; G08G 1/005; B60R 21/34; B60W 50/14; B60W 40/09;
(Continued)

(56) References Cited

U.S. PATENT DOCUMENTS 8,547,249 B2 * 10/2013 David .................... G08G 1/166
                                                             340/903
9,049,583 B2     6/2015 Kolodziej
(Continued)

OTHER PUBLICATIONS

Dhondge, et al., "WiFiHonk: Smartphone-Based Beacon Stuffed WiFi Car2X-Communication System for Vulnerable Road User Safety," 2014 IEEE 79th Vehicular Technology Conference (VTC Spring), Seoul, South Korea, May 18-21, 2014, pp. 1-5. doi: 10.1109/VTCSpring.2014.7023146.
(Continued)

*Primary Examiner* — Munear T Akki
(74) *Attorney, Agent, or Firm* — Brandon Hicks; Eversheds Sutherland (US) LLP

(57) ABSTRACT

Systems and methods for connected vehicle and mobile device communications are provided herein. An example method includes determining a distracted condition for at least one of a driver or a pedestrian by evaluating actions occurring within in a vehicle of the driver or on a mobile device of the pedestrian; determining a distraction level for either the driver or the pedestrian based on the actions occurring within in the vehicle or on the mobile device; and providing an alert message to the mobile device or a human machine interface of the vehicle based on the distraction level, the alert message warning of a distracted condition of the pedestrian or the driver.

10 Claims, 3 Drawing Sheets

(51) Int. Cl.
*B60R 21/34* (2011.01)
*B60W 50/14* (2020.01)
*B60W 40/09* (2012.01)
*H04W 4/44* (2018.01)

(58) Field of Classification Search
CPC ......... H04W 4/44; H04W 4/029; H04W 4/46; H04W 4/90; G06K 9/00845; G06K 9/00791; G08B 21/24
See application file for complete search history.

(56) References Cited

U.S. PATENT DOCUMENTS

| | | | |
|---|---|---|---|
| 9,421,909 B2 | 8/2016 | Strickland et al. | |
| 9,460,601 B2 | 10/2016 | Mimar | |
| 10,099,608 B2 | 10/2018 | Cuddihy et al. | |
| 2009/0002197 A1* | 1/2009 | Cemper | G08B 21/22 340/989 |
| 2011/0001635 A1* | 1/2011 | Akens | G08G 1/052 340/936 |
| 2012/0264406 A1* | 10/2012 | Mohler | H04M 1/72454 455/414.1 |
| 2012/0265977 A1* | 10/2012 | Ewell, Jr. | G06F 1/1694 713/100 |
| 2014/0004840 A1* | 1/2014 | Ewell, Jr. | G06F 3/013 455/418 |
| 2015/0035685 A1* | 2/2015 | Strickland | B60Q 1/525 340/901 |
| 2015/0109148 A1* | 4/2015 | Cheatham, III | G01S 7/4804 340/944 |
| 2018/0290590 A1* | 10/2018 | Goldman-Shenhar | B60Q 1/506 |
| 2020/0380273 A1* | 12/2020 | Saez | H04W 4/40 |

OTHER PUBLICATIONS

Wang, et al. "WalkSafe: A pedestrian safety app for mobile phone users who walk and talk while crossing roads," HotMobile '12, San Diego, California, Feb. 28-29, 2012 (6 pages). doi: 10.1145/2162081.2162089.

Zhenyu, et al., "Design and evaluation of V2X communication system for vehicle and pedestrian safety," The Journal of China Universities of Posts and Telecommunications 2015, 22(6):18-26. doi:10.1016/51005-8885(15)60689-6.

* cited by examiner

SYSTEMS AND METHODS FOR CONNECTED VEHICLE AND MOBILE DEVICE COMMUNICATIONS

TECHNICAL FIELD

The present disclosure relates to connected vehicle and mobile device communications, and more specifically to systems and methods that detect distracted conditions of drivers and/or pedestrians and transmit warnings to drivers and/or pedestrians when distracted conditions are determined.

BACKGROUND

With rising traffic levels and ubiquitous cell phones use, the number of distracted vehicle drivers and pedestrians engaged in cell phone-related activity has significantly increased. The number of injuries and fatalities on roadways due to such activity warrants ways and means to detect and alert distracted users to prevent accidents by communicating timely accident warnings.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to analyze and determine distracted conditions for drivers and/or pedestrians and warn the same when a distracted condition is determined. Some of the advantages includes risk mitigation strategies that alert pedestrians and/or drivers who may be distracted and/or who are in proximity to one another. For example, a pedestrian may be distracted using a mobile device when texting or watching media. The pedestrian may be located in an area where connected vehicles are operating or are entering. In another example, a path of a pedestrian and a path of a vehicle may converge at a point in the future when either the pedestrian and/or the driver are distracted. The systems and methods herein may be configured to warn pedestrians and/or drivers of an impending dangerous situation based on a distracted state. Some embodiments allow for coordinated communication between a plurality of vehicles and/or a plurality of mobile devices. Within the context of this disclosure, a pedestrian may be a user of a mobile device, whereas a driver may be a user of a vehicle.

Some embodiments allow for specific determinations between distracted and non-distracted states of both drivers and pedestrians based on their interactions with mobile devices and/or vehicle features. Some distracted condition determinations are bounded by time frames or periods of time. In some embodiments, a distracted condition is assigned a distraction level or score based on a risk level of actions occurring on the mobile device and/or within a vehicle. These and other advantages of the present disclosure are provided in greater detail herein.

Illustrative Embodiments

Figure 1:
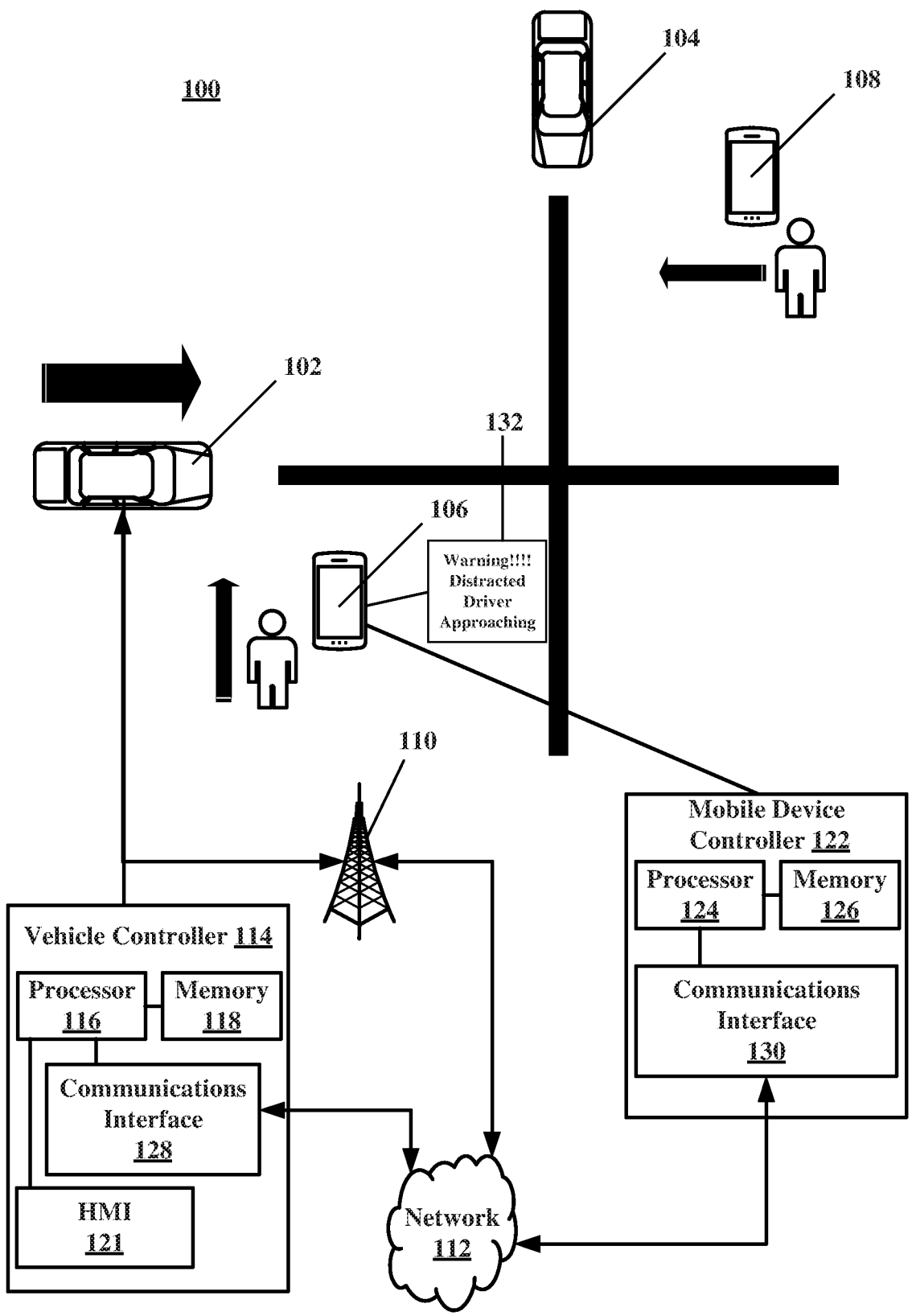
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include one or more connected vehicles such as vehicle 102 and vehicle 104, one or more mobile devices such as mobile device 106 and mobile device 108, communications infrastructure elements such as a base station 110, each of which may utilize a network 112 as needed. The network 112 may include any one or a combination of multiple different types of networks, such as cable networks, the Internet, wireless networks, and other private and/or public networks. In some instances, the network 112 may include cellular, Wi-Fi, or Wi-Fi direct. In some embodiments, some functionalities disclosed herein can be executed entirely at the connected vehicle. In other embodiments, some functionalities disclosed herein can be executed entirely at the mobile device level. In other embodiments, some functionalities disclosed herein can be executed cooperatively at the connected vehicle level and the mobile device level together.

In some embodiments, each of the connected vehicles, such as the vehicles 102 and 104 comprises a vehicle controller 114 that comprises a processor 116 and memory 118. The memory 118 stores instructions that are executed by the processor 116 to perform aspects of the distracted condition analysis and warning which are disclosed herein. When referring to operations executed by the vehicle controller 114 it will be understood that this includes the execution of instructions by the processor 116. While the following descriptions will reference the vehicle controller 114 in view of the vehicle 102, it will be understood that the vehicle 104 is similarly configured to perform aspects of the present disclosure. In some embodiments, the vehicle 102 and the vehicle 104 can cooperatively communicate through a vehicle-to-vehicle communication protocol over the network 112. In some embodiments, the vehicles 102 and 104 can communicatively couple through the communications infrastructure elements such as a base station 110, which may in turn leverage the network 112. In various embodiments, the vehicle 102 comprises a communications interface 128 that allows the vehicle controller 114 to access the communications infrastructure elements and/or the network 112. This communicative coupling allows for vehicle-to-vehicle and/or vehicle-to-mobile device communications. As an example, the communications interface 128 can utilize LTE-V2X (PC5) or any other similar communications protocol. In another example, the communications interface 128 utilizes cellular connectivity through a backhaul or via a remote switching unit (RSU) of the communications infrastructure elements.

In various embodiments, the vehicle 102 comprises a human machine interface (HMI 121), such as a touchscreen display and/or voice control system. A driver can control various features of the vehicle 102 such as audio, navigation, climate control, and the like using the HMI 121.

In some embodiments, each of the mobile devices, such as the mobile devices 106 and 108 comprises a mobile device controller 122 that comprises a processor 124 and memory 126. The memory 126 stores instructions that are executed by the processor 124 to perform aspects of the distracted condition analysis and warning disclosed herein. When referring to operations executed by the mobile device controller 122 it will be understood that this includes the execution of instructions by the processor 124. While the following descriptions will reference the mobile device controller 122 in view of the mobile device 106, it will be understood that the mobile device 108 is similarly configured to perform aspects of the present disclosure. According to some embodiments, the mobile device 106 can comprise a communications interface 130 that allows the mobile device controller 122 to access the communications infrastructure elements and/or the network 112. As noted above, this communicative coupling allows for vehicle-to-vehicle and/or vehicle-to-mobile device communications. In one or more embodiments, the mobile device 106 installs and executes an application that provides various features related to distracted condition analysis and warning which are disclosed herein. In other embodiments, distracted condition analysis and warning delivery can occur through native functions or communications protocols enabled on the mobile device 106 such as LTE-V2X (PC5) noted above.

The following descriptions provide additional example details on the distracted condition analysis and warning processes which can be implemented at the mobile device and/or vehicle levels. In general, a distracted condition can be determined from actions occurring at the device level. For example, a user engaging with a text messaging feature, an application, playing of media, scrolling of a webpage, and so forth, are all actions occurring on a mobile device. In some embodiments, actions can be determined by tracking and evaluating input/output device level operations of a vehicle or a mobile device. In another example, distraction can be determined by evaluating communications signals received or transmitted by a vehicle or mobile device. For example, packets indicative of text or short messages can be determined, as well as data packets that are indicative of media streaming.

Any behavior which is distracting to a user of the mobile device 106 or the vehicle 102 may qualify as an action if such behavior can be quantified or measured. The mobile device controller 122 is configured to determine when actions are being performed on the mobile device 106 and transmit indications of these actions to the vehicle 102 using V2X-capable communications. In other embodiments, a connected vehicle such as the vehicle 102 can be configured to determine actions occurring on the mobile device 106 using other methods that would be known to one of ordinary skill in the art. Similarly, a driver of the vehicle 102 may be distracted based on a variety of actions such as interactions with the HMI 121 or interactions with other vehicle features such as signaling, turning, parking maneuvers, and the like.

In some embodiments, a determination is made as to a distraction level associated with the actions. For example, using voice features of the mobile device 106 may be regarded as being associated with a distraction level that is lower than when a user is typing a message on a screen or keyboard of the mobile device 106. An even higher distraction level may be determined when the user is reading or scrolling through webpages on the mobile device 106. In some embodiments, another distraction level is determined when a user is watching media on the mobile device 106. Other distractions levels can be assigned for different actions and in some embodiments, combinations of actions can be assigned higher distraction levels than those assigned to individual actions.

In some embodiments, the determination of distraction levels can be performed by the mobile device controller 122, while in other embodiments the distraction level analysis can be performed by vehicle controller 114. Again, it will be understood that since either a pedestrian or a driver may be distracted, the disclosed distraction level analysis applies to both pedestrians and drivers. These methods can also be used to determine a distraction level of a driver who is also using a mobile device. Thus, pedestrians and other connected vehicles can be warned when a vehicle is being operated by a driver who is distracted by use of their mobile device when operating a vehicle at the same time. In some embodiments, this combination of distractions poses a unique level of risk and a specific warning or alert can be transmitted based on this specific condition. Additional details regarding the transmission of alert messages are provided in greater detail infra. For purposes of clarity, some embodiments may refer to a distraction level of a pedestrian as a pedestrian distraction level and a distraction level of a driver as a driver distraction level.

According to some embodiments, a determination of a pedestrian or driver's distraction condition and level of distraction includes a continuous or period determination of a transition between distracted and non-distracted states/conditions. Thus, the controllers disclosed herein can denote a connected user's state in terms of cycling between distracted or non-distracted. The distracted status itself may comprise a plurality of possible levels as described above. In general, the driver distraction level and/or the pedestrian distraction level can each fluctuate between distracted and non-distracted states.

According to various embodiments, fluctuations between distracted and non-distracted states can be determined by sensing actions over periods of time. In some embodiments a default initial state of a connected user (e.g., driver or pedestrian) is non-distracted. When a controller (such as the vehicle controller or the mobile device controller) determines that a user engages in the use of a connected device or engaged with the device within a period of time (could be seconds as an example), such as touching the screen or writing a text message, a state changes to distracted with the appropriate value. The period of time is referred to as vDistractionTrigInterval, which is a triggering interval of time that can be measured as a duration of seconds. In various embodiments, vNotDistractedTrigInterval is another time interval that can be measured as a duration of seconds. The vNotDistractedTrigInterval time interval is indicative of when the mobile device is not being utilized by a user for the specified period of time. That is, if the user has not engaged the device for an interval of vNotDistractedTrigInterval seconds or more, the device reverts to a non-distracted state. When this condition is present the user is determined to be in a non-distracted state, whereas the vDistractedTrigInterval is a time interval during which the mobile device is being utilized by the user. During the vDistractedTrigInterval time intervals the user is considered to be in a distracted state. Again, corresponding metrics are determined at the vehicle level as well.

Any user input to a device (such as the HMI or mobile device) would denote user engagement. Alternatively, the states remain the previous state. Stated otherwise, a driver is considered to be in a non-distracted state if no actions occur at the vehicle level after a triggering interval of time after the distracted condition of the driver has been determined. Likewise, a pedestrian is considered to be in a non-distracted state if no actions occur at the mobile device level after a triggering interval of time after the distracted condition of the pedestrian has been determined.

The above methods provide a connected device with general means to auto-detect user distraction. Again, this can occur at a mobile device or vehicle level. In some embodiments, these methods are coupled with a proximity and/or spatial evaluation. In general, there is no need to alert a distracted pedestrian of a vehicle or vehicles that are not within their vicinity or will not be within their vicinity in the immediate future. On the other hand, close proximity between mobile devices and vehicles are an additional factor that increases a need for alerting users of their own distractions or the distracted states of others.

Thus, the vehicle controller 114 and/or the mobile device controller 122 can be configured to determine if the vehicle 102 and mobile device 106 are within a specified distance to one another or if vehicle 102 and mobile device 106 are likely to be in proximity to one another based on a potential intersection there between. In some embodiments, the vehicle controller 114 can assess a path of travel of both the vehicle 102 and mobile device 106. In one or more embodiments, the vehicle controller 114 can determine if the mobile device 106 is within a given area around a vehicle or within a path of travel of the vehicle 102.

By way of example, based on a heading and velocity of a pedestrian using the mobile device 106, the pedestrian will likely encounter an intersection or road that the vehicle 102 is traveling within. This determination can be based on GPS signals used to track the vehicle 102 or through a navigation feature of the vehicle controller 114. Other methods for tracking a mobile device and/or vehicle such as dead reckoning can also be utilized.

In some embodiment, at both sides of a communication link (i.e., pedestrian and driver), the connected devices can also compute a time to potential intersection based on relative speeds. In various embodiments, alerts that are based on a distraction level may be given at an appropriate time based on miscellaneous factors. For example, a fast-moving car driving at 50 mph might create quicker alerts than if it is driving at 25 mph. Similarly, the alert can go out earlier if a pedestrian is moving too rapidly (using jerky acceleration levels from the device's IMU) in a non-open sky GNSS (global navigation satellite system) environment.

According to some embodiments, a safety time threshold can be utilized when considering intersection times between pedestrians and vehicles. If an intersection time is less than some specified critical safety time threshold, an appropriate alert is generated at both sides of the V2X link (i.e. vehicle controller and mobile device controller). For instance, for a distracted pedestrian, the vehicle controller 114 and/or the mobile device controller 122 can generate an audio warning, produce a text alert (such as text alert 132) or on-screen message alert flashes and/or both an audio warning and on-screen depending on their exact distraction state. These are merely example warning or alert messages that can be provided based on a determination of a distracted condition, whether or not an impending intersection between a pedestrian and vehicle are determined. In some embodiments, thresholds can be created for both pedestrians and drivers. For example, a pedestrian threshold distraction level can be used as a basis for determining if a pedestrian is sufficiently distracted to require an alert message. Examples where no alert messages are transmitted even when distracting actions are occurring at the mobile device and/or vehicle level can be based on distraction score calculations, which are disclosed in greater detail herein.

On the other hand, even a non-distracted connected user (i.e., either driver or pedestrian) can be alerted to the possibility of a crash risk with the distracted user. For example, the vehicle controller 114 of the vehicle 102 can transmit messages to the vehicle 104 generally alerting it to conditions such as pedestrian or other vehicle proximity to the vehicle 104. An example situation when the V2X-based alerting may not be executed is when both the driver and the pedestrian are in non-distracted states.

Based on a distracted state being determined, both the intersecting driver and pedestrian users through V2X capability may be alerted. The communication for the alert can be unicast/multicast (i.e., driver to pedestrian) or alternatively. This is in addition to the Personal Safety Message (PSM) that can be broadcast to a plurality of users in the vicinity. For example, the PSM can be transmitted by the vehicle controller 114 to the mobile device 106 and the mobile device 108 when they are proximate to the vehicle 102.

The disclosed methods of alerting users may also have an alert suppression mechanism also situations where there are a large number of such messages. This may prevent multiple redundant alerts to the pedestrian or the driver. In some embodiments, if the number of distracted devices/users in a defined vicinity or area of interest is higher than a threshold, the relevant devices may just provide a general alert to the effect that there are distracted drivers/pedestrians in the area. In some embodiments, the area around a user can be defined by a virtual geo-fence. When this number falls below the threshold, the general alert is cleared and the system goes back to providing individual alerts.

In some embodiments, to help in determining the crash risk, a history of user behavior can be shared between an intersecting driver and a pedestrian (e.g., between vehicle and mobile device controllers). In one example embodiment, a history of behaviors is shared which includes an amount of time a user has been in a particular distraction (or non-distraction) state as described earlier. For instance, this history is an iteration based on the time when the state occurred as follows state at time (n), state at time t (n−1), state at time t (n−2), and so forth.

Communicating an entire history of user states may impose unacceptable communication overhead (especially if the states are updating at a high frequency) and create privacy risks. Alternatively, the history of states can be denoted in terms of distraction score(s) that represent a grade between 0 and 1 for the level of user distraction in the past few seconds. Thus, the distraction level and its associated action(s) can be converted to a distraction score. One example method to calculate a distraction score is to multiply the states (e.g. distracted=1, non-distracted=0) by values using an exponential decay function, and then aggregate the same to compute a distraction score. In this case, older states contribute diminishing weight, whereas recent ones have a higher weight in the calculated distraction score.

When transmitted for alerting users, a value of the distraction score may be used to warrant different responses for the driver and the pedestrian. For example, a distraction score of less than 0.2 could warrant no response for the driver or pedestrian, a distraction score within a range of approximately 0.2 to approximately 0.7 could result in an alert for the driver only. A distraction score of greater than 0.7 could strongly alert both the driver and the pedestrian. Strong alerts include alerts repeated in their frequency and/or alerts that have specific content or types. For example, a loud audible tone is output when the danger level is high and the tone can be repeated in increments of several seconds. Alternatively, the content of a textual message could indicate a severity of the danger level or a type of actions that produced the distracted state. For example, wording of the message can vary as the danger level fluctuates. In one example, the message is more generalized such as "be watchful for oncoming traffic" and in another example, when the danger level is increased the message could state "Warning!!!! Distracted Driver Approaching."

A vehicle controller can transmit an alert message to a mobile device when the vehicle controller determines that a driver of the vehicle is using their mobile device while driving. Other high danger situations include high speed vehicle movement or highly populated locations.

Figure 2:
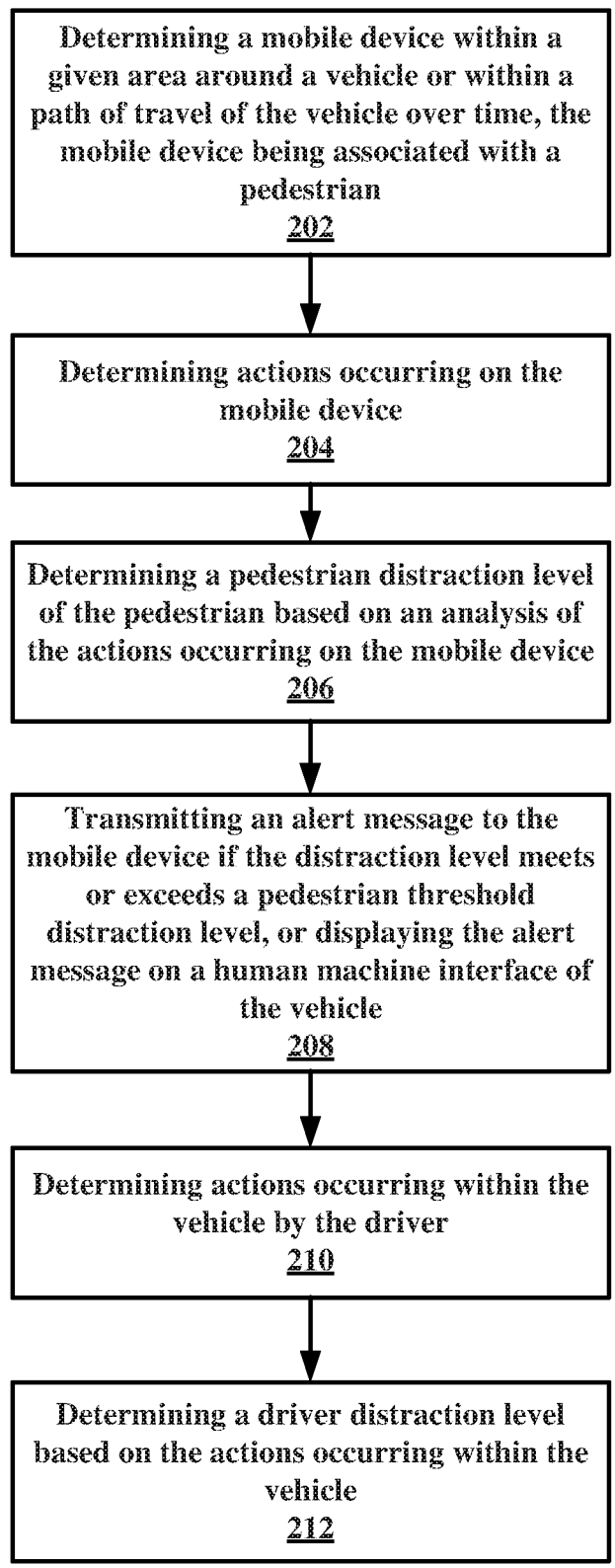
FIG. 2 is a flowchart of an example method of the present disclosure for determining distracted conditions and providing warning messages to pedestrians and/or drivers.

FIG. 2 is a flowchart of an example method of the present disclosure. According to some embodiments, the method includes a step 202 of determining a mobile device within a given area around a vehicle or within a path of travel of the vehicle over time, the mobile device being associated with a pedestrian. Next, the method includes a step 204 of determining actions occurring on the mobile device. For example, the user may be texting, viewing a webpage or media, or potentially engaged in a call.

When actions are detected, the method includes a step 206 determining a pedestrian distraction level of the pedestrian based on an analysis of the actions occurring on the mobile device. As noted above, this process can include determining actions within periods of time, where a user is in a distracted state only if actions are occurring within specific time frames. When these periods elapse without subsequent detection of an action the user is considered to revert back to a non-distracted state.

According to some embodiments, the method includes a step 208 of transmitting an alert message to the mobile device if the distraction level meets or exceeds a pedestrian threshold distraction level, or displaying the alert message on a human machine interface of the vehicle. In this example, the alert message warns a driver of a distracted condition of the pedestrian.

The method can also include a process for assessing and warning a pedestrian of a distracted state of a driver. In some embodiments, the method includes a step 210 of determining actions occurring within the vehicle by the driver. Next, the method includes a step 212 of determining a driver distraction level based on the actions occurring within the vehicle. It will be understood that the alert message can be transmitted to the mobile device if the driver distraction level meets or exceeds a driver threshold distraction level value. To be sure, the alert message warns the pedestrian of a distracted condition of the driver. Of note, the method can also be adapted to warn pedestrians or other drivers of potentially hazardous conditions such as a speeding vehicle in a crowded location, which are a specific type of action performed by a driver.

Figure 3:
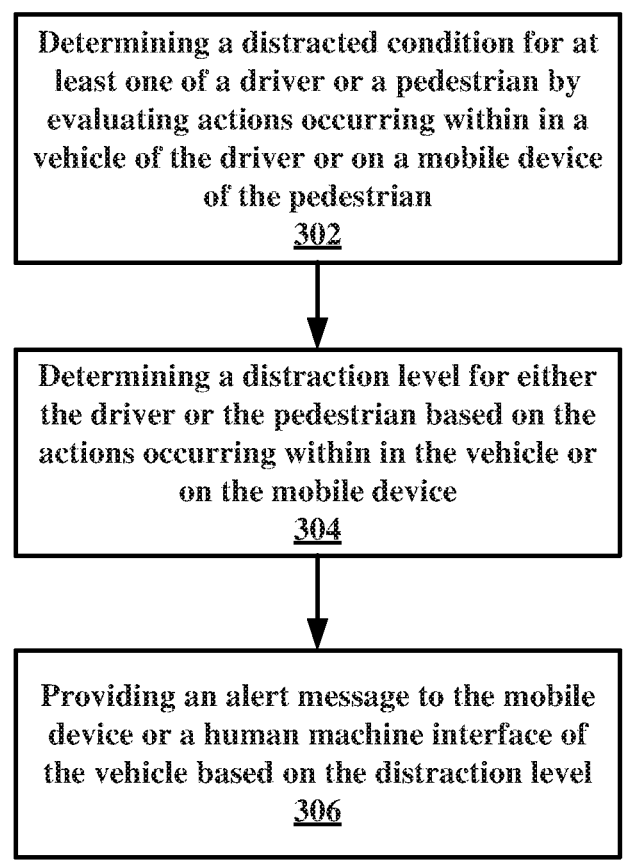
FIG. 3 is a flowchart of another example method of the present disclosure for determining distracted conditions and providing warning messages to pedestrians and/or drivers.

FIG. 3 is a flowchart of another example method of the present disclosure. The method includes a step 302 of determining a distracted condition for at least one of a driver or a pedestrian by evaluating actions occurring within in a vehicle of the driver or on a mobile device of the pedestrian. That is, in this method, a distracted condition can be determined for a pedestrian, a driver of a vehicle, and/or both the pedestrian and the driver. The method also can include a step 304 of determining a distraction level for either the driver or the pedestrian based on the actions occurring within the vehicle or on the mobile device. As noted above, this can occur by sensing and evaluating input/output operations, communications data received or transmitted, or applications executing at the mobile device and/or the vehicle level.

In various embodiments, the method includes a step 306 of providing an alert message to the mobile device or a human machine interface of the vehicle based on the distraction level. As noted above, an alert message warns pedestrians and/or drivers of a distracted condition of the pedestrian or the driver.

In one or more embodiments, the method includes determining a time to intersection based on relative motion of the mobile device and the vehicle. A delivery time or a transmission frequency of the alert message is increased as the time to intersection decreases. The transmission frequency can also be adjusted based on a distraction score calculated for the distraction level and/or the corresponding action or actions of the distraction level.

The method can also include steps such as determining an intersection of a vehicle with a pedestrian as well as a time to intersection and transmitting these data in an alert message. The alert message may alert to other vehicles of a distracted condition of the pedestrian.

Example Embodiments

In some instances, the following examples may be implemented together or separately by the systems and methods described herein.

Example 1 may include a method, comprising: determining a mobile device within a given area around a vehicle or within a path of travel of the vehicle, the mobile device being associated with a pedestrian; determining one or more actions occurring on the mobile device; determining a pedestrian distraction level of the pedestrian based on an analysis of the one or more actions occurring on the mobile device; and transmitting an alert message to the mobile device and/or the vehicle if the pedestrian distraction level meets or exceeds a pedestrian threshold distraction level that indicates a distracted condition of the pedestrian.

Example 2 may include the method according to example 1 and/or some other example herein, further comprising: determining one or more actions occurring within the vehicle; and determining a driver distraction level based on the one or more actions occurring within the vehicle, wherein the alert message is transmitted to the mobile device if the driver distraction level meets or exceeds a driver threshold distraction level that indicates a distracted condition of a driver.

Example 3 may include the method according to example 2 and/or some other example herein, further comprising determining a distraction score for the one or more actions based on distraction type, the driver distraction level, and/or the pedestrian distraction level.

Example 4 may include the method according to example 3 and/or some other example herein, wherein the alert message is transmitted by a vehicle controller to one or more other vehicles that are proximate to the mobile device or to one or more mobile devices in proximity to the mobile device.

Example 5 may include the method according to example 4 and/or some other example herein, wherein the driver distraction level and the pedestrian distraction level each fluctuate between distracted and non-distracted states, wherein the driver is considered to be in a non-distracted state if no actions occur after a triggering interval of time after the distracted condition of the driver has been determined.

Example 6 may include the method according to example 5 and/or some other example herein, wherein the pedestrian is considered to be in a non-distracted state if no actions occur after a triggering interval of time after the distracted condition of the pedestrian has been determined.

Example 7 may include a method, comprising: determining a distracted condition for at least one of a driver or a pedestrian by evaluating one or more actions occurring within in a vehicle of the driver or on a mobile device of the pedestrian; determining a distraction level for at least one of the driver and/or the pedestrian based on the one or more actions occurring within in the vehicle or on the mobile device; and providing an alert message to the mobile device and/or a human machine interface of the vehicle based on the distraction level, the alert message warning of a distracted condition of the pedestrian and/or the driver.

Example 8 may include the method according to example 7 and/or some other example herein, further comprising determining a time to intersection between the pedestrian and the vehicle based on relative motion of the mobile device and the vehicle, wherein a delivery time or a transmission frequency of the alert message is increased as the time to intersection decreases or the distraction level increases.

Example 9 may include the method according to example 8 and/or some other example herein, further comprising: determining one or more other vehicles which will intersect with the pedestrian and/or the vehicle within the time to intersection; and transmitting the alert message to the one or more other vehicles of the distracted condition of the pedestrian and/or the vehicle.

Example 10 may include the method according to example 7 and/or some other example herein, wherein the alert message comprises one or more of an audible warning, a text-based message, or a graphical user interface with content.

Example 11 may include the method according to example 7 and/or some other example herein, wherein when the mobile device is one of a plurality of mobile devices in an area, and the distraction level for each of the plurality of mobile devices meets or exceeds a pedestrian threshold distraction level, the alert message is a generalized alert transmitted to each of the plurality of mobile devices.

Example 12 may include the method according to example 7 and/or some other example herein, further comprising determining a time period during which the pedestrian and/or the driver have been in the distracted condition.

Example 13 may include the method according to example 12 and/or some other example herein, further comprising determining a distraction score for the pedestrian and/or the driver based on a duration of the time period and/or the one or more actions.

Example 14 may include the method according to example 13 and/or some other example herein, wherein content of the alert message is based on the distraction score.

Example 15 may include a system, comprising: a processor; a memory for storing executable instructions, the processor executing the instructions to: determine a distracted condition for at least one of a driver or a pedestrian by evaluating one or more actions occurring within in a vehicle of the driver and/or on a mobile device of the pedestrian; determine a distraction level for at least one of the driver and/or the pedestrian based on the one or more actions occurring within in the vehicle and/or on the mobile device; and provide an alert message to at least one of the mobile device and/or a human machine interface of the vehicle based on the distraction level, the alert message warning of a distracted condition of the pedestrian and/or the driver.

Example 16 may include the system according to example 15 and/or some other example herein, wherein the processor further executes the instructions to: determine a time to intersection based on relative motion of the mobile device and the vehicle, wherein a delivery time or a transmission frequency of the alert message is increased as the time to intersection decreases; determine one or more other vehicles having intersection within the time to intersection; and transmit the alert message to the one or more other vehicles of the distracted condition of the pedestrian and/or the driver.

Example 17 may include the system according to example 16 and/or some other example herein, wherein the alert message comprises one or more of an audible warning, a text-based message, or a graphical user interface, and wherein when the mobile device is one of a plurality of mobile devices in an area, and the distraction level for each of the plurality of mobile devices meets or exceeds a pedestrian threshold distraction level, the alert message is a generalized alert transmitted to each of the plurality of mobile devices.

Example 18 may include the system according to example 17 and/or some other example herein, wherein the processor further executes the instructions to determine a time period during which the pedestrian and/or the driver have been in the distracted condition.

Example 19 may include the system according to example 18 and/or some other example herein, wherein the processor further executes the instructions to determine a distraction score for the pedestrian and/or the driver based on the one or more actions occurring within the vehicle of the driver and/or on the mobile device of the pedestrian.

Example 20 may include the system according to example 19 and/or some other example herein, wherein content of the alert message is based on the distraction score.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for connected vehicles and mobile device communications, comprising:

determining, by one or more processors, a mobile device within a given area around a vehicle or within a path of travel of the vehicle, the mobile device being associated with a pedestrian;

determining, by the one or more processors, one or more actions occurring on the mobile device;

determining, by the one or more processors, a pedestrian distraction level of the pedestrian based on an analysis of the one or more actions occurring on the mobile device;

transmitting, by the one or more processors, an alert message to the mobile device and/or the vehicle based on the pedestrian distraction level meeting or exceeding a pedestrian threshold distraction level that indicates a distracted condition of the pedestrian;

determining, by the one or more processors, one or more actions occurring within the vehicle; and determining, by the one or more processors, a driver distraction level based on the one or more actions occurring within the vehicle, wherein the alert message is transmitted to the mobile device according to the driver distraction level meets or exceeds a driver threshold distraction level that indicates a distracted condition of a driver, wherein the driver distraction level and the pedestrian distraction level each fluctuate between distracted and non-distracted states, wherein the driver is considered to be in a non-distracted state if no actions occur after a triggering interval of time after the distracted condition of the driver has been determined, and wherein the pedestrian is considered to be in a non-distracted state if no actions occur after a triggering interval of time after the distracted condition of the pedestrian has been determined.

2. The method according to claim 1, further comprising determining, by the one or more processors, a distraction score for the one or more actions based on distraction type, the driver distraction level, and/or the pedestrian distraction level.

3. The method according to claim 2, wherein the alert message is transmitted by a vehicle controller to one or more other vehicles that are proximate to the mobile device or to one or more mobile devices in proximity to the mobile device.

4. The method according to claim 1, further comprising determining, by the one or more processors, a time to intersection between the pedestrian and the vehicle based on relative motion of the mobile device and the vehicle, wherein a delivery time or a transmission frequency of the alert message is increased as the time to intersection decreases or the distraction level increases.

5. The method according to claim 4, further comprising:
determining, by the one or more processors, one or more other vehicles which will intersect with the pedestrian and/or the vehicle within the time to intersection; and
transmitting, by the one or more processors, the alert message to the one or more other vehicles of the distracted condition of the pedestrian and/or the vehicle.

6. The method according to claim 1, wherein the alert message comprises one or more of an audible warning, a text-based message, or a graphical user interface with content.

7. The method according to claim 1, wherein when the mobile device is one of a plurality of mobile devices in an area, and the distraction level for each of the plurality of mobile devices meets or exceeds a pedestrian threshold distraction level, the alert message is a generalized alert transmitted to each of the plurality of mobile devices.

8. The method according to claim 1, further comprising determining, by the one or more processors, a time period during which the pedestrian and/or the driver have been in the distracted condition.

9. The method according to claim 8, further comprising determining, by the one or more processors, a distraction score for the pedestrian and/or the driver based on a duration of the time period and/or the one or more actions.

10. The method according to claim 9, wherein content of the alert message is based on the distraction score.

* * * * *